US006295283B1

(12) United States Patent
Falk

(10) Patent No.: US 6,295,283 B1
(45) Date of Patent: Sep. 25, 2001

(54) METHOD FOR PROVIDING CONNECTIONLESS DATA SERVICES OVER A CONNECTION-ORIENTED SATELLITE NETWORK BY ASSOCIATING IP SUBNETS WITH DOWNLINK BEAM IDENTIFIERS

(75) Inventor: Aaron D. Falk, San Pedro, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/309,952

(22) Filed: May 11, 1999

(51) Int. Cl.[7] .............................. H04B 7/185; H04L 12/28
(52) U.S. Cl. ......................... 370/325; 370/349; 370/395; 370/474; 455/428
(58) Field of Search ................................. 370/315, 316, 370/319, 321, 322, 323, 325, 347, 348, 349, 352, 353, 354, 355, 389, 392, 393, 395, 396, 397, 398, 399, 466, 467, 474, 475; 455/12.1, 427, 428, 429, 430; 342/352, 354

(56) References Cited

U.S. PATENT DOCUMENTS

| | | |
|---|---|---|
| 5,432,777 | 7/1995 | Le Boudec et al. ................. 370/399 |
| 5,517,497 | 5/1996 | Le Boudec et al. ................. 370/397 |
| 5,736,959 * | 4/1998 | Patterson et al. .................... 342/354 |
| 5,822,310 * | 10/1998 | Chennakeshu et al. ............. 370/317 |

* cited by examiner

Primary Examiner—Kwang B. Yao
(74) Attorney, Agent, or Firm—Connie M. Thousand

(57) ABSTRACT

A method for transferring a data message, in a connectionless manner between a selected source terminal and a selected destination terminal, in a communications network which supports connection-oriented communications. The network has a plurality of source and destination terminals in addition to satellites having up and downlink antenna beams. One of the uplink beams covers the selected source terminal and one of the downlink antenna beams covers the selected destination terminal. Downlink beam identifiers are assigned to each downlink antenna beam in the network. An address is assigned to each destination terminal so that the address of the selected destination terminal includes a downlink beam identifier of one downlink antenna beam in the network which covers the selected destination terminal. The downlink beam identifier is used to route the data message through the network.

23 Claims, 5 Drawing Sheets

| Allocated IP Addresses for IPv4 | | | |
|---|---|---|---|
| 128.3.1.1 | 128.3.1.2 | 128.3.1.3 • • • | 128.3.1.255 |
| 128.3.2.1 | 128.3.2.2 | | |
| 128.3.3.1 | | • | • |
| • | | • | • |
| • | | • | • |
| • | | | |
| 128.3.255.1 | | • • • | 128.3.255.255 |

| Satellite Local Look-up Table ||
|---|---|
| Downlink Beam Identifier Value | Local Routing Value |
| 199 | 1 (Crosslink 14) |
| 200 | 2 (Crosslink 14) |
| 201 | 3 (Crosslink 14) |
| ⋮ | ⋮ |

56

| Satellite Local Look-up Table ||
|---|---|
| Downlink Beam Identifier Value | Local Routing Value |
| 199 | 1 (Downlink 22) |
| 200 | 2 (Downlink 22) |
| 201 | 3 (Crosslink 14) |
| ⋮ | ⋮ |

62

METHOD FOR PROVIDING CONNECTIONLESS DATA SERVICES OVER A CONNECTION-ORIENTED SATELLITE NETWORK BY ASSOCIATING IP SUBNETS WITH DOWNLINK BEAM IDENTIFIERS

This invention was made with Government support under Contract number F04701-97-C-0025 awarded by the Department of the Air Force. The Government has certain rights in this invention.

BACKGROUND OF THE INVENTION

The present invention relates generally to data transfer systems, and more particularly to a method for sending data in a connectionless manner in a network which supports connection-oriented communications.

Connection-oriented networks are traditionally associated with telephony and other types of communications where an association between a sender and receiver exists for a relatively long period of time (i.e., on the order of minutes). Connection-oriented communications are used when resources need to be assigned to guarantee that the data is received and processed by the proper destination terminal. Connection-oriented communications are typically used for data which is sensitive to delay and/or delay variation. Many networks which support connection-oriented communications use the Asynchronous Transfer Mode (ATM) protocol for data message transfers because it is a relatively fast, highly reliable switching protocol. A more detailed discussion of the ATM protocol can be found in CCITT, "Draft Recommendation I.363." CCITT Study Group XVIII, Geneva, Jan. 19–29, 1993.

The process of exchanging information on a connection-oriented network usually requires some signaling between the source and destination (and possibly a network manager) to negotiate the parameters of the connection before any useful data is exchanged. This is efficient when the delay required for signaling is small relative to the duration of the time spent to exchange information.

In contrast, connectionless networks such as the global Internet, are traditionally associated with computer networks and other types of communications where an association between a sender and receiver exists on a per-packet basis (i.e., on the order of milliseconds). Connectionless communication networks do not utilize advance signaling before sending data; therefore, there is no opportunity for the network to evaluate whether a given transmission can be guaranteed to reach its destination in a timely manner. Connectionless communications are typically used for lower priority data, such as Internet Protocol (IP) data, where it is not imperative that data will arrive at and be processed by the proper destination terminal in a timely fashion.

Once a geosynchronous satellite is introduced into the path between the source and destination or between the source and the network manager, the cost in delay of performing connection-oriented communications is exacerbated. For connection-oriented communications over a satellite with an on-board cell relay switch, to establish a communications link between a source terminal and a destination terminal, the following setup procedure steps need to be conducted:

a) A request is sent from the source terminal over the satellite to the Network Operations Center (NOC) asking for a connection identification address (CID) for a connection to the destination terminal and a channel for communications.

b) A channel, a CID and a path through the satellite cell switch are allocated by the NOC.

c) The channel allocation, CID, and path through the satellite cell switch are sent to the satellite.

d) The channel allocation and CID are sent to both the source terminal and the destination terminal.

Although this set-up procedure requires a significant amount of time, it accomplishes many purposes the most significant of which is that a path from a satellite uplink to a satellite downlink is created through the satellite network for the routing of cells with the header CID. In addition, the source terminal will know that it can use the allocated channel for communication with the desired destination terminal; the desired destination terminal will listen only to the allocated channel and accept only the packets with the proper CID in the header; and, other destination terminals do not use their resources to accept packets not intended for their use freeing up resources for communications with other source terminals.

After the set-up procedure is completed, the following additional steps are performed in order to send a message from the source terminal to the destination terminal:

a) The source terminal divides the message into one or more cells, each of which is of a length compatible with the data message transfer protocol used by the network. For networks which use the ATM protocol, this step is conducted in accordance with a predetermined ATM Adaptation Layer (AAL) protocol. As required by most protocols, each cell includes a header.

b) The source terminal places the allocated CID into the proper location in the header of each cell.

c) The cells are sent to a satellite.

d) Each cell is routed to the downlink antenna which covers the desired destination terminal.

e) The cells are broadcast by the downlink antenna.

f) The cells with the proper CID in the header are accepted by the destination terminal and reassembled back into the original massage.

The CID is an address identifying the connection between a specific source terminal and destination terminal. It is temporary and used for a single communication. After the communication between the source terminal and the destination terminal is complete, the connection is broken and the channel can be reused for another communication either between the same source and destination terminal or a new source and destination terminal. The CID can also be reused for another communication either between the same source and the destination terminal, a new source and the destination terminal or a new source and a new destination terminal.

In contrast, for connectionless communications, the message is sent from the source terminal to the destination terminal without first completing the set-up portion of the procedure. Sending a message in a connectionless communications networks takes much less set-up time than sending a message in a connection-oriented communications system since the set-up procedure with a NOC or network manager is not required. However, in a connectionless communications system there is no guarantee that the downlink antenna will have the channel capacity available to broadcast the packets to the destination terminal, nor is there a guarantee of resources in the on-board cell switch.

With the advent of the Internet, the demand to transport data in a connectionless manner has increased tremendously. Therefore, it would be advantageous to develop a scheme to send data, such as IP data, in a connectionless manner over a system which supports connection-oriented communications. It would also be advantageous to do so in a manner which is compatible with the ATM protocol used in many connection oriented systems.

U.S. Pat. Nos. 5,432,777 and 5,517,497 disclose a method for sending data in a connectionless manner over a connection-oriented network which includes assigning a routing identifier (RI) to each terminal in the network and placing a destination terminal RI in the header of each cell of the message. For this method, the source terminal consults a global look-up table which correlates each terminal in the system with an RI in a unique mapping arrangement. The source terminal places the destination terminal RI in the header of each cell. The cells are sent to a node in the system. Each node must read the destination terminal RI in the header of each cell and determine the proper routing sequence required for the cells to be transmitted to the proper destination terminal.

The cells are routed through each satellite to the desired destination terminal. The destination terminal only accepts cells having its individual destination terminal RI in the headers. After the data is routed to the proper destination terminal, the destination terminal typically must separate, or demultiplex, the cells since cells sent from different source terminals are multiplexed together before arriving at the destination terminal. To separate multiple streams of data coming from different source terminals to the same destination terminal, the '777 and '497 patents disclose using a multiplexing identification (MID) field in the cell headers where the value of the MID field allows, at the destination side, to identify the cells which belong to the same connectionless message. This value has to be unique. The '777 and '497 patents prefer that the source RI value be used as the MID and either the last ten bits of the RI value are taken as the MID or, the header is extended to allow more bits to be used. Using the MID field to demultiplex cells from different sources restricts the ATM Adaptation Layer (AAL) protocol which can be used to demultiplex the cells to the ATM Adaptation Layer ¾ (AAL¾) protocol. A more detailed discussion of AAL protocols can be found in CCITT, "Draft Recommendation I.363." CCITT Study Group XVIII, Geneva, Jan. 19–29, 1993. The AAL¾ protocol has a MID field, but, the newer ATM Adaptation Layer 5 (AAL5) protocol does not. Therefore, the method specified in the '777 and '497 patents does not support the newer AAL5 protocol which is typically the adaptation layer protocol of choice for IP data transfers among those skilled in the art. Thus, the scheme defined in the '777 and '497 patents are deficient for various network environments.

In co-pending application Ser. No. 09/262,890, filed Mar. 10, 1999, a method was detailed to solve the inadequacies of the prior art. This method assigned unique beam identifiers to each downlink antenna beam in the network and mapped the destination terminal address of the selected destination terminal to a beam identifier indicating which antenna beam covered the selected destination terminal. The beam identifier was placed in the header of each cell of the message and was used to route the cells to the proper downlink antenna.

The step of mapping the destination terminal address to a downlink beam identifier requires a separate look-up table at each source terminal which correlates destination terminal addresses to downlink beam identifiers. This table requires resources in the network to generate and maintain the look-up tables. What is needed is a method for sending data in a connectionless manner over a network which supports connection-oriented communications in which the method does not require a separate look-up table correlating destination terminal addresses to downlink beam identifiers.

SUMMARY OF THE INVENTION

The preceding and other shortcomings of the prior art are addressed and overcome by the present invention which provides, in a first aspect, a method for transferring a data message in a connectionless manner between a selected source terminal and a selected destination terminal, in a communications network which supports connection-oriented communications. The communications network has a plurality of source terminals, destination terminals, and satellites having uplink and downlink antenna beams. One of the uplink antenna beams covers the selected source terminal and one of the downlink antenna beams covers the selected destination terminal.

A downlink beam identifier is assigned to each downlink antenna beam which uniquely identifies each downlink antenna beam within the network. An address is assigned to each destination terminal so that a preselected portion of each address contains the downlink beam identifier associated with one of the downlink antenna beams covering each destination terminal.

A data package is formulated comprising the data message and the address of the selected destination terminal. The data packet is segmented into one or more cells, each of which has a predetermined length, with a portion of each cell comprising the cell header. Each cell header is formatted with sufficient information to route the cells from the selected source terminal to the selected destination terminal. To do so, a cell type identifier field and a downlink beam identifier field are defined within each cell header. A preselected value is placed into the cell type identifier field of each cell header to indicate that the cell is to be treated in a connectionless manner. The downlink beam identifier is copied from the address of the selected destination terminal. The copied downlink beam identifier is placed into the downlink beam identifier field of each cell header.

The downlink beam identifier is used by the network to route the cells though the network to the satellite having the downlink antenna beam associated with the downlink beam identifier. The cells are broadcasted over the selected downlink antenna beam and are received by destination terminals covered by the selected downlink antenna beam, one of the destination terminals being the selected destination terminal.

In a first aspect, the selected source terminal is assigned a source terminal identifier value which uniquely identifies the selected source terminal within the network. A source terminal identifier field is defined in each cell header and the source terminal identifier value corresponding to the preselected source terminal is placed in the source terminal identifier field of each cell header. The destination terminals located within the selected downlink antenna beam sort the cells by the source terminal identifier value.

In a second aspect, the destination terminals covered by the downlink antenna beam determine for whom the cells are meant by examining the cell bodies of each cell received until the address of the destination terminal is identified from the destination address. In a third aspect, a cell loss priority field and payload type identifier field are additionally identified in each cell header and are formatted with predetermined values which are consistent with a preselected AAL protocol, and the cells are sent through a network which uses the ATM for data message transfers.

BRIEF DESCRIPTION OF THE DRAWINGS

Reference is now made to the detailed description of the preferred embodiments illustrated in the accompanying drawings, in which:

FIG. 3 shows an example of a plurality of allocated IP addresses to be assigned to the destination terminals of FIG. 2;

DETAILED DESCRIPTION OF THE PREFERRED EMBODIMENTS

Figure 1:
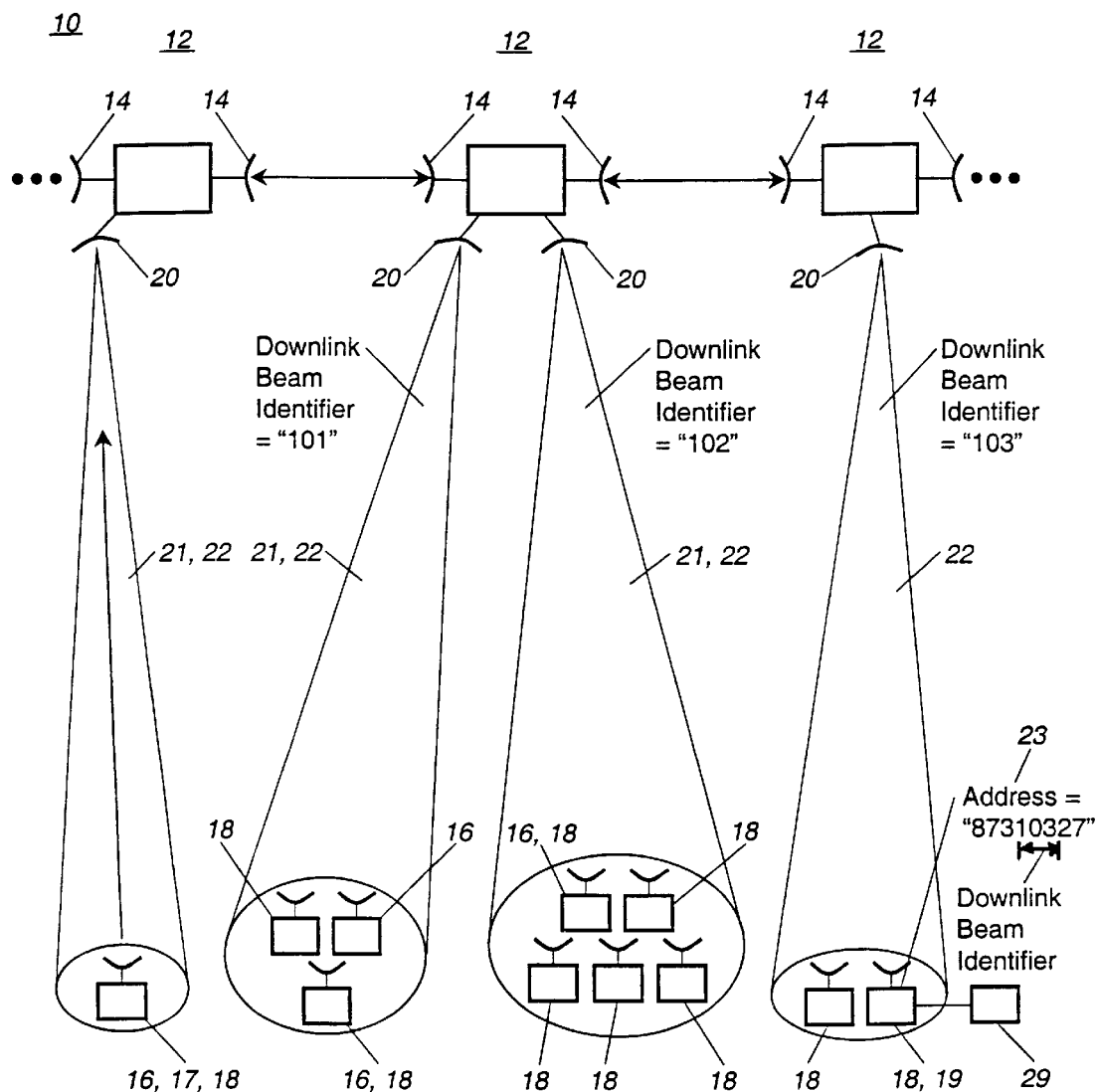
FIG. 1 is a schematic diagram of a communications network in which the present invention may be used.

FIG. 1 shows the configuration of a communications network 10 in which the present invention may be used. The network 10 supports connection-oriented communications. For the preferred embodiment of the invention, the network 10 uses an ATM protocol for data message transfers. The network 10 includes several satellites 12 which are interlinked by the use of crosslink antennas 14. The network 10 also includes a plurality of source terminals 16 and destination terminals 18. Any source terminal 16 can function as a destination terminal 18 and vice versa. The source 16 and destination 18 terminals are linked to the satellites 12 by way of the up and downlink antennas 20 which provide uplink 21 and downlink 22 antenna beams. Each antenna 20 has an antenna beam 21,22 which can cover a plurality of source 16 and destination 18 terminals. The antennas 20 can be multiple beam antennas where each antenna 20 provides a multiplicity of antenna beams 21, 22. The antennas 20 can also be dual uplink/downlink antennas, dedicated uplink and downlink antennas or the like. In addition, uplink channels may be shared or dedicated to a single source terminal 16.

Each satellite 12 can have one or more crosslink antennas 14 making a variety of satellite network configurations such as a star network or a ring network possible. However, the invention will be explained for the general case of a linear network 10 shown in FIG. 1.

The present invention overcomes the limitations of the prior art by providing a method for transferring a data message, such as an IP data message, between a selected source terminal 17 and a selected destination terminal 19, in a connectionless manner over a network 10 which supports connection-oriented communications in which the method does not require a separate look-up table correlating destination terminal addresses 23 to downlink beam identifiers. The method includes assigning a downlink beam identifier to each downlink antenna beam 22 in the network 10 and assigning an address 23 to each destination terminal 18 so that the address 23 of the selected destination terminal 19 includes a downlink beam identifier of one downlink antenna beam 22 in the network 10 which covers the selected destination terminal 19. The downlink beam identifier is used to route the data message through the network 10. For the preferred embodiment of the invention, the method provides for data message transfers in a connectionless manner in a network which uses the ATM and a preselected AAL protocol for data message transfers.

The first step in the process relates to assigning addresses 23 to each destination terminal 18 within the network 10. For a first embodiment of the invention, the network 10 has complete control over the format and formulation of each address 23. In such a network 10, the following steps are conducted to assign addresses 23 to each destination terminal 18:

A) Each downlink antenna beam 22 in the network 10 is assigned a downlink beam identifier which uniquely identifies each downlink antenna beam 22 within the network 10. For example, downlink beam identifiers of "101," "102" or "103" could be assigned to three different downlink antenna beams 22 in the network 10.

B) Each destination terminal 18 in the network 10 is assigned an address 23, a preselected portion of each address 23 comprises a downlink beam identifier corresponding to one of the downlink antenna beams 22 in the network 10 which covers each destination terminal 18. For example, an address 23 of "8731037" could be assigned to one of the destination terminals 18 which is covered by the downlink antenna beam 22 corresponding to the downlink beam identifier of "103."

Figure 2:
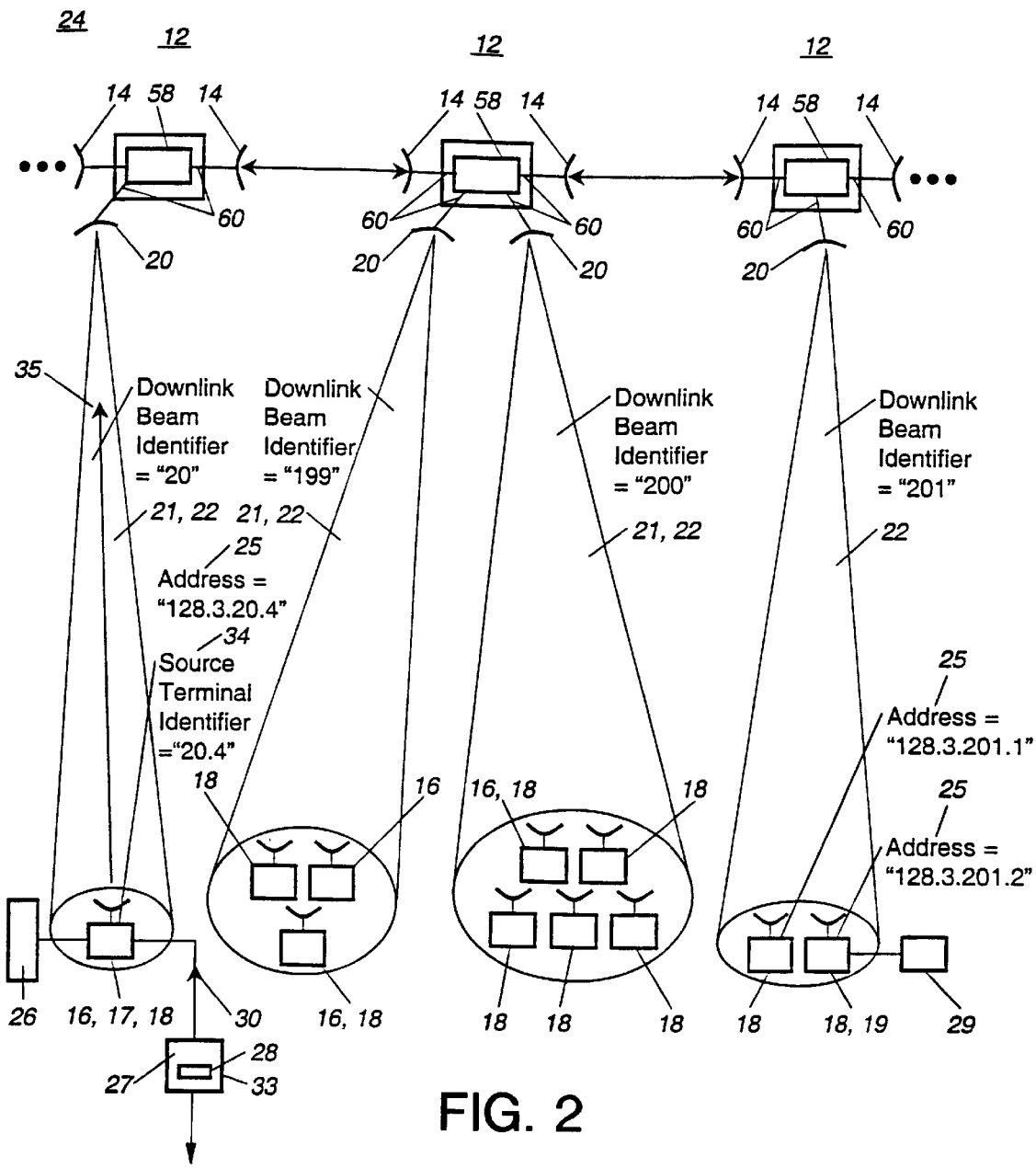
FIG. 2 is a schematic diagram of a communications network which is IP compatible.

Referring to FIGS. 2 & 3, for a second embodiment of the invention, the network 24 does not have control over the format and formulation of the addresses 25. An example of this type of a network is an IP compatible network 24 which uses IP addresses 25. In such a network 24, the IP addresses 25 will typically be pre-formulated and formatted by a provider 26 which is outside of the network 24. Each IP address 25 will typically follow a standard IP bit allocation such as 32 bits for IP version 4 (IPv4, shown in FIG. 3) or 128 bits for IP version 6 (IPv6, not shown) and each IP address 25 will follow a standard IP format such as ABCD for IPv4 or ABCD:EFGH:IJKL:MNOP for IPv6, where each letter represents a hexadecimal number between 0 and 255. A more detailed discussion of IP formats can be found in the book "Internetworking with TCP/IP" by Doug Comen.

Each address in a network has a network prefix and a host or node identifier. The network prefix is common to each node in the network and the host or node identifier is unique to each node in the network. For Internet addresses 25, the higher order bits (those starting at the left) are used for the network prefix and the lower order bits represent the host identifier. Sometimes, allocated hosts will have a common bit pattern in the higher order bits of the host identifier field. These can be used to identify a subnetwork or subnet.

For an IP compatible network 24, the following additional steps are required to assign addresses 25 to destination terminals 18:

1) A request is made to an authorized IP address allocation authority to allocate a plurality of consecutive IP addresses 25 to the network 24.

2) The addressing authority allocates a plurality of IP addresses 25 to the network 24 in which each IP address 25 has a common network prefix. For example, as shown in FIG. 3, a plurality of IP addresses 25 could be assigned to the network 24 (FIG. 2) in which each IP address 25 has a format of 128.3.C.D where "128.3" is the network prefix.

3) A determination is made as to which portion of each address 25 is to be identified as a downlink beam identifier. The number of bits required in each IP address 25 for a downlink beam identifier is determined by the number of downlink antenna beams 22 in the network 24 as well as the number of destination terminals 18 within any one downlink antenna beam 22. As an example, for the addresses 25 shown in FIG. 3, the "C" field of each address 25 could be selected to contain the downlink beam identifier. As such, each destination terminal 18 covered by a selected downlink antenna beam 22 would be assigned an IP address 25 which contains the same number in the "C" field. Referring to FIG. 2, for example, the two destination terminals 18 covered by the same downlink antenna beams 22 could be assigned addresses 25 of 20.4.201.1 and 20.4.201.2 and the downlink antenna beam 22 covering the two destination terminals 18 would be assigned a downlink beam identifier of "201."

The exact location and number of bits allocated within each address 25 to contain the downlink beam identifier is dependant on the number of downlink antenna beams 22 in the network 24 as well as the number of destination terminals 18 within each downlink antenna beam 22 for a particular network. As such, entire fields or portions of one or more than one field can be selected to contain the downlink beam identifier.

Figure 4:
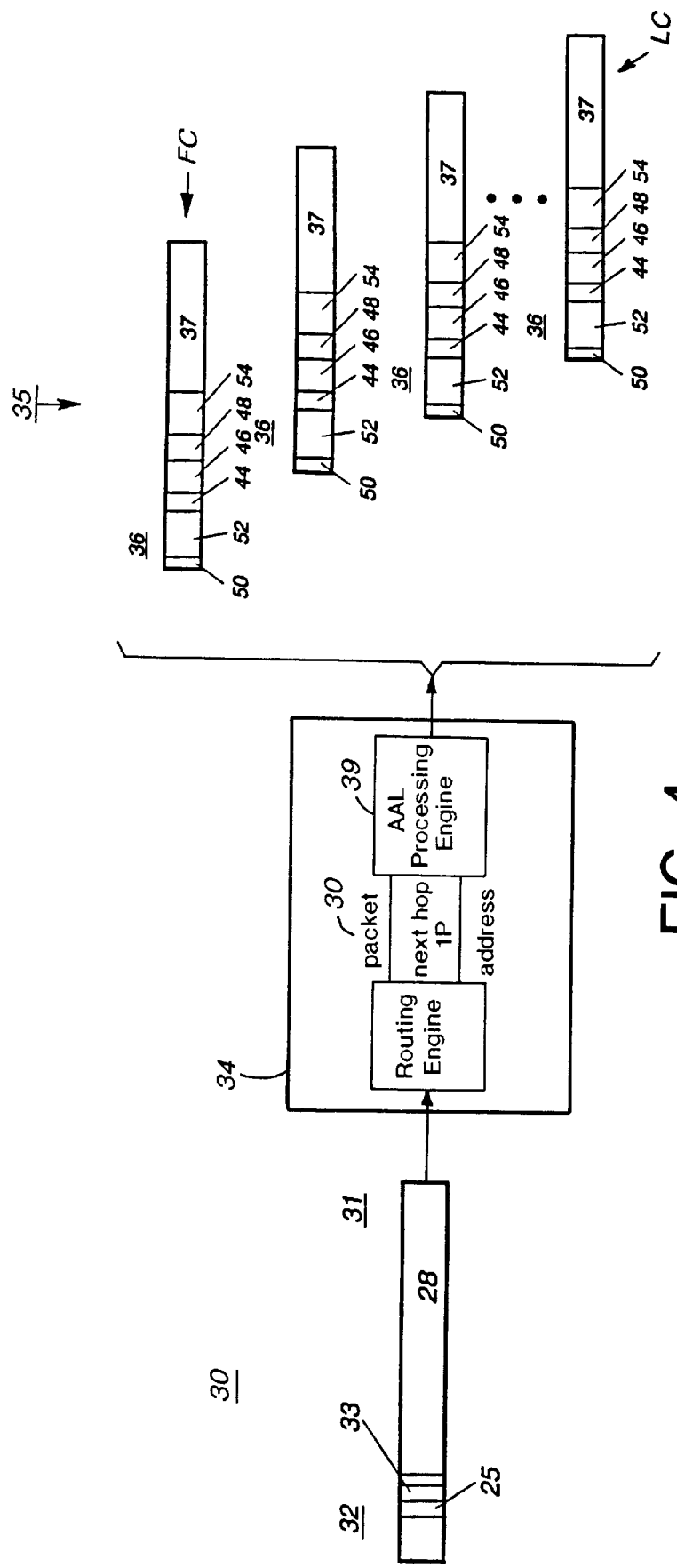
FIG. 4 shows a data packet and the cells formed after segmentation of the data packet per an adaptation layer segmentation process.

Once an address is assigned to every host and terminal 18 in the network 24, standard IP route advertisement protocols disseminate reachability information throughout the adjacent networks (not shown). Referring to FIG. 4, routers 34 on the periphery of the satellite network 24 (FIG. 2) are now able to forward IP packets 30 through the cell batch network. The router 34 receives packets 30 from inside or outside the network 24 (FIG. 2). The routing engine within the router 34 uses routing algorithms known to one skilled in the art to make a next-hop IP address determination. The next-hop IP address corresponds to the IP address of the selected destination terminal 19 (FIG. 2). Additional information on next-hop IP addresses can be found in the Internetworking with TCP/IP reference cited above. The router 34 also performs the AAL processing to segment the data packet 30 into cells 35 and correctly configure the header 32 of each cell 35. Internally to the router 34, the IP packet 30 and the next-hop IP address are forwarded to the AAL processing engine 39 which uses the subnet ID to correctly fill out each cell header 36.

Referring back to FIG. 2, the next step in the process relates to assigning a source terminal identifier 34 to each source terminal 16 in the network 24 which desires to participate in connectionless service. As will be subsequently discussed, the source terminal identifier 34 is used by the destination terminals 18 to sort cells sent from different source terminals 16. Each source terminal 16 is assigned a source terminal identifier 34 which is unique to each source terminal 16 either for the life of the network 24 or for the duration of time the source terminal 16 participates in connectionless service. Preferably, the source terminal identifier 34 is a portion of the address 25 of the source terminal 16. It is preferred that each source terminal identifier 34 be the address 25 of each source terminal 16 with the network prefix deleted. For example, if the IP address 25 for a selected source terminal 17 is 128.3.20.4, the source terminal identifier 34 would preferably be 20.4.

Referring again to FIG. 4, the next step of the process relates to segmenting the data packet 30 into appropriately sized cells 35 which can be sent over the network 24. To do so, the data packet 30 is segmented into one or more cells 35 with each cell 35 being of a preselected length of which a first portion 36 comprises the cell header 36 and a second portion 37 comprises the cell body 37. Preferably, the segmentation process is conducted in accordance with an ATM segmentation process known to one skilled in the art. A more detailed discussion of ATM segmentation processes can be found in CCITT, "Draft Recommendation I.363." CCITT Study Group XVIII, Geneva, Jan. 19–29, 1993. In accordance with the ATM segmentation process, the entire data packet 30 is segmented amongst one or more of the cell bodies 37 such that the address 25 of the selected destination terminal 19 and the address 33 of the sender 27, which are included in the message header 32, are segmented amongst one or more of the cell bodies 37 and neither the address 33 of the sender 27, nor the address 25 of the selected destination terminal 19 is included in a cell header 36. Typically, the destination terminal address 25 is segmented such that it is completely included in the cell body 37 of the first cell (FC) of a plurality of cells 35.

The length of each cell 35 is chosen to be compatible with the particular data message transfer protocol used by the network 24. For the preferred embodiment of the invention, the AAL5 protocol defines the format and process for segmentation of the data packet 30. In particular, the AAL5 protocol specifies that the data packet 30 be segmented into one or more cells 35 with each cell 35 having a length of 53 octets of which the first 5 octets comprise the cell header 35.

Figures 5, 6, 7:
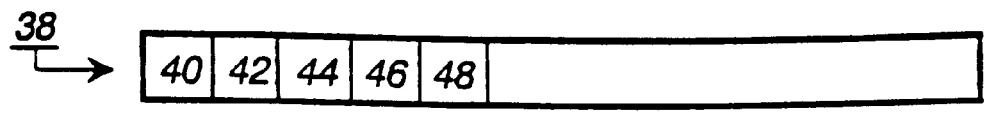
FIG. 5 shows an example of a typical ATM cell and fields within a typical ATM header; and, FIGS. 6 & 7 show examples of satellite local look-up tables.

The next step in the process relates to assigning fields within each cell header 36. For the preferred embodiment of the invention, the assignments are conducted in such a manner that the cells 35 and cell headers 36 are compatible with the preselected ATM protocol. Referring to FIG. 5, ATM protocols define fields within a typical ATM cell header 38. These fields include a virtual path identifier (VPI) field 40, a virtual communication identifier (VCI) field 42, a header error correction (HEC) field 44, a cell loss priority field 46 and a payload type identifier field 48. The VPI 40 and VCI 42 fields are used for connection-oriented communications, the HEC field 44 is used for header error correction, the cell loss priority field 46 is used to perform ATM traffic management and the payload type identifier field 48 is used to identify the first cell of a message using the AAL5 segmentation protocol.

Referring to FIGS. 4 & 5, the cell loss priority 46 and payload type identifier 48 fields are retained in each cell header 36. The HEC field 44 can also be retained. If the HEC field 44 is not retained, the satellite network 10 (FIG. 1) should provide sufficient error protection to prevent unacceptable header errors. The VPI 40 and VCI 42 fields are not retained in each cell header 36. Instead, a cell type identifier field 50, a source terminal identifier field 52, and a downlink beam identifier field 54 are defined in each cell header 36.

The overall length of each cell 35 is maintained at a length compatible with the preselected ATM protocol, which is 53 octets for the AAL5 protocol. For one embodiment of the invention, each cell header 36 comprises the first five octets of each cell 35 and the cell loss priority 46, payload type identifier 48, cell type identifier field 50, source terminal identifier 52 and downlink beam identifier fields 54 are located within each cell header 36. For another embodiment of the invention, the HEC field 44 is also included in the first five octets of each cell 35. For still another embodiment of the invention, each cell header 36 encompasses more than the first five octets of each cell 35 and, each cell 35 remains at the predetermined length which is 53 octets for the AAL5 protocol. For this embodiment, the cell loss priority field 46, payload type identifier field 48, cell type identifier field 50 and source terminal identifier field 52 are located within the first five octets of each cell 35 and the downlink beam identifier field 54 is located within the header 36 but after the first five octets of each cell 35. This increases the size of one or more of the fields 44–54. In particular, this allows for the size of the source terminal identifier field 52 and the downlink beam identifier field 54 to be increased which can be advantageous since the size of the source terminal identifier field 52 and downlink beam identifier field 54 constrains the number of source terminals 16 (FIG. 2) and destination terminals 18 which can participate in connectionless service.

The next step in the process relates to formatting each field 44–54 with sufficient information to route the cells 35 from a selected source terminal 16 through the network 24 to a selected destination terminal 18 and do so in a connectionless manner. To format each field 44–54, the following steps are conducted:

1) A preselected value is placed in the cell type identifier field 50 in each cell header 36 to indicate that the cell 35 is to be treated in a connectionless manner.

2) The downlink beam identifier is copied from the address 25 of the selected destination terminal 19 which is located in the message header 32 of the data packet 30.

3) The copied downlink beam identifier is placed into the downlink beam identifier field 54 of each cell header 32.

4) A source terminal identifier 34, which corresponds to the selected source terminal 17 which is sending the cells 35, is placed in each source terminal identifier field 52. For the preferred embodiment of the invention, the source terminal identifier 34 is a portion of the address 25 of the selected source terminal 17 so that the source terminal identifier 34 can be copied directly from the address 25 of the selected source terminal 17 and placed in each source terminal identifier field 52.

5) A predetermined value which is consistent with the preselected AAL protocol is placed in the cell loss priority field 46 of each cell 35.

6) A predetermined value which is consistent with the preselected AAL protocol is placed in the payload type identification field 48 and is used to identify the first cell of a message.

7) For embodiments of the invention which include a header error correction field 44, a predetermined value is placed in the header error correction field 44 and is used for header error correction.

The next step in the process relates to routing the cells 35 through the network 24 and to the selected destination terminal 18. The cells 35 are sent from a source terminal 16 to a satellite 12 through an uplink antenna beam 21 where the satellite electronics (not shown) are programmed to recognize the cell type identifier field 50 in each cell header 36 and realize that the cells 35 are to be sent in a connectionless manner. Next, the satellite electronics read the downlink beam identifier field 54 and uses that value to route the cells 35. To do so, each satellite 12 generates a downlink beam identifier look-up table, examples of which are of the form shown in FIGS. 6 & 7, which map downlink beam identifier values to local routing values. The satellite electronics reads the downlink beam identifier value located in the downlink beam identifier field 54. A local look-up table 56 (FIG. 4) is consulted for a local routing value. This local routing value is used to route the cells 35 through a satellite on-board cell switch 58 (FIG. 2) directly to the correct switch output port 60 on the satellite 12, which may be either a downlink antenna 20 or a crosslink antenna 14. For this embodiment, each satellite 12 has a local look-up table 56 (FIG. 4) or 62 (FIG. 5) to accomplish this function, meaning that, the look-up for a downlink beam identifier value for one satellite 12 (FIG. 2) could result in a local routing value which takes the cell to a crosslink antenna 14 while in another satellite 12, the look-up for the same downlink beam identifier value would result in a local routing value which takes the cell to a downlink antenna 20.

For example, in the first satellite local look-up table 56 shown in FIG. 6, a downlink beam identifier value of "200" routes the cell to switch port 1 which is a crosslink antenna 14 (FIG. 2) whereas in the second satellite local look-up table 62 shown in FIG. 7, the downlink beam identifier value of "200" routes the cell to switch port 2 which is a downlink antenna 20 (FIG. 2). This allows each satellite 12 to determine how to route the cells and does not require the selected source terminal 17 or a satellite 12 to provide end-to-end routing information. In this way, each satellite look-up table 56 (FIG. 6) or 62 (FIG. 7) can be a local table such that a look up table which is common to the network 24 (FIG. 1) is not required to route the cells.

Using local look-up tables, the cells 35 are routed through each successive satellite on-board cell switch 60 until the cells 35 arrive at the satellite 12 that contains the selected downlink antenna beam 22 which corresponds to the downlink beam identifier value. This selected downlink antenna beam 22 covers a plurality of destination terminals 18 one of which is the selected destination terminal 19. The cells 35 are broadcast over the selected downlink antenna beam 22. The destination terminals 18 within the selected downlink antenna beam 22 receive all the cells 35. This includes the selected destination terminal 19.

The next step of the process relates to sorting the cells 35. In some networks, if different source terminals 16 are sending cells 35 to the same downlink antenna beam 22 at any given time, the cells 35 from the different source terminals 16 can become interleaved together prior to transmission over a downlink antenna beam 22. Then, the destination terminals 18 must sort or demultiplex the cells 35 sent to correctly reassemble the data packet 30 and read the data message 28 contained therein. In this type of a network, the destination terminals 18,19 receiving the cells 35 use the value in the source terminal identifier field 52 (FIG. 4) to sort the cells 35.

In other networks, cells 35 from the same source terminal 16 with different priorities may become intermixed as they pass through a satellite on-board cell switch 60. In this type of a network, the destination terminals 18 receiving the cells 35 use the value in the cell loss priority field 46 (FIG. 4) together with the value in the source terminal identifier field 52 to demultiplex the cells 35. To do so, the destination terminals 18,19 receiving the cells 35 first sort the cells 35 by source terminal identifier field 52 and then further sort those cells 35 by cell loss priority field 46.

Referring to FIGS. 2 & 4, the next step in the process relates to determining for which destination terminal 18,19 the cells 35 are meant. Each destination terminal 18,19 covered by downlink antenna beam 22 receives all the cells 35 sent down the downlink beam 22 and must make a decision whether to keep the cells 35 or discard them. For typical prior art systems, the header of each cell contains information such as a destination terminal address which indicates for whom the information is meant. As previously mentioned, placing a destination terminal address or a destination terminal identifier in the header of each cell consumes valuable space within each cell. For the present invention, no such information is included in the cell headers 36. To determine for whom the cells 35 are meant, all the destination terminals 18,19 receiving the cells 35 can reassemble the cells 35 back into the original data package 30 and read the destination terminal address 25 which will be located within the message header 32 once the message header 32 is reassembled. Alternatively, each destination terminal 18,19 can examine the cell bodies 37 of each cell 35 received to identify the destination address 25 which was distributed amongst one or more of the cell bodies 37 during the segmenting step previously described. Or, each destination terminal 18,19 can reassemble only a portion of the message header 32 from one or more of the cells 35 to read the destination address 25. Then, each destination terminal 18,19 can choose to keep or drop subsequent cells 35 sent from the same source terminal 16 until the last cell (LC) in a message has been received.

After identifying the destination terminal address 25, each destination terminal 18,19 uses known routing mechanisms to determine if the destination address 25 matches either the destination terminal's own address or is reachable from the destination terminal 18. If not, the destination terminal 18 discards the cells 35. The selected destination terminal 19 recognizes that the destination terminal address 25 matches its address and retains all the cells 35.

The present invention provides a method for sending data in a connectionless manner between a selected source terminal 16 and a selected destination terminal 18 over a network 24 which supports connection-oriented communications. The method assigns addresses 25 to destination terminals 18,19 in a manner so that each address 25 includes a downlink beam identifier corresponding to a downlink antenna beam 22 which covers each destination terminal 18,19. The method formats the cell headers 36 with sufficient information to route the cells 35, from a selected source terminal 17 to the selected destination terminal 19 in a manner which is free of placing the selected destination terminal address 25 or a destination terminal identifier in the header 36 of each cell 35 of a message, thereby saving space in the header 36 of each cell 35. In addition, embodiments of the method are compatible with selected ATM protocols, particularly, the AAL5 protocol.

It will be appreciated by persons skilled in the art that the present invention is not limited to what has been shown and described hereinabove. The scope of invention is limited solely by the claims which follow.

What is claimed is:

1. A method for transferring a data message in a connectionless manner from a selected source terminal to a selected destination terminal, in a communications network which supports connection-oriented communications, the communications network having a plurality of source terminals, destination terminals and satellites having uplink and downlink antenna beams with one of the uplink antenna beams covering the selected source terminal and a selected downlink antenna beam covering the selected destination terminal, the method comprising the steps of:

assigning a selected downlink beam identifier to said selected downlink antenna beam which uniquely identifies the selected downlink antenna beam within the network;

assigning an address to the selected destination terminal of which a preselected portion includes the selected downlink beam identifier of the selected downlink antenna beam covering the selected destination terminal;

formulating a data packet comprising said data message and said address of said selected destination terminal;

segmenting said data packet into one or more cells, each cell being of a predetermined length a first portion of which comprises a cell header and a second portion of which comprises a cell body;

formatting each said cell header with sufficient information to route said cells from said selected source terminal to said selected destination terminal comprising the steps of:

defining a cell type identifier field and a downlink beam identifier field in each cell header, placing a predetermined value into said cell type identifier field of each said cell header to identify that said cells are to be treated in a connectionless manner, copying the selected downlink beam identifier from the address of the selected destination terminal, placing said copied downlink beam identifier into the downlink beam identifier field of each of the cell headers;

sending said cells to a selected satellite in the network through one of the uplink antenna beams;

using said selected downlink beam identifier to route the cells in the network to the satellite having the selected downlink antenna beam corresponding to the selected downlink beam identifier;

broadcasting said cells over the selected downlink antenna beam; and, receiving said cells by destination terminals located within said selected downlink antenna beam, one of the destination terminals being the selected destination terminal.

2. The method of claim 1, further comprising the step of:

assigning a source terminal identifier value to the selected source terminal in the communications network;

defining a source terminal identifier field in each cell header; and, placing the source terminal identifier value corresponding to the selected source terminal into the source terminal identifier field of each cell headers; and, sorting said cells by source terminal identifier value by said destination terminals located within said downlink antenna beam.

3. The method as in claim 2, further comprising the step of:

assigning an address to the selected source terminal of which a preselected portion includes the source terminal identifier value corresponding to the selected source terminal; and, the step of placing the source terminal identifier value further comprises the steps of:

copying the source terminal identifier value from the address of the selected source terminal and placing the copied source terminal identifier value into the source terminal identifier field of each of the cell headers.

4. The method as in claim 2, further comprising the steps of:

defining a priority field in each cell header, and, placing a preselected value in the priority field of each cell to indicate a priority of each cell.

5. The method as in claim 4, further comprising the step of sorting said cells by said value in said priority field.

6. The method as in claim 4, further comprising the steps of defining a header error correction field in each cell header, and, placing a predetermined value into said header error correction field which is to be used for header error correction.

7. The method of claim 4, further comprising the steps of:

examining the cell body of each cell received by said destination terminals until said address of said selected destination terminal has been identified;

determining by said selected destination terminal that a user corresponding to said destination address is reachable by said selected destination terminal; and, retaining the cells by said selected destination terminal.

8. The method of claim 7, further comprising the step of assembling the retained cells back into said data packet by said selected destination terminal.

9. The method of claim 7, further comprising the steps of:

determining by other destination terminals receiving said cells that a user corresponding to said address of said selected destination terminal is unreachable; and, discarding said cells by destination terminals which cannot reach said user.

10. The method of claim 9, wherein the step of examining said cell body of each cell received by said destination terminals until said destination address has been identified further comprises the step of:

reassembling said cells into a partial data packet by each destination terminal receiving the cells so that the address of the selected destination terminal is reassembled.

11. A method for transferring a data message in a connectionless manner between a selected source terminal and a selected destination terminal, in a communications network which uses the Asynchronous Transfer Mode (ATM) and a preselected ATM Adaptation Layer (AAL) Protocol for data message transfers and supports connection-oriented communications, the communications network having a plurality of source terminals, destination terminals and satellites having uplink and downlink antenna beams with one of the uplink antenna beams covering the selected source terminal and a selected downlink antenna beam covering the selected destination terminal, the method comprising the steps of:

assigning a selected downlink beam identifier to said selected downlink antenna beam which uniquely identifies the selected downlink antenna beam within the network;

assigning an address to the selected destination terminal of which a preselected portion includes the selected downlink beam identifier of the selected downlink antenna beam covering the selected destination terminal;

formulating a data packet comprising said data message and said address of said selected destination terminal;

segmenting said data packet into one or more cells in accordance with said AAL Protocol to generate a plurality of cells, each of which has a predetermined length of which a first predetermined portion comprises a cell header and a second predetermined portion of which comprises a cell body;

identifying fields within each cell header in accordance with said AAL Protocol, said fields comprising a virtual path identifier (VPI) field, a virtual communication identifier (VCI) field, a header error correction (HEC) field, a cell loss priority field and a payload type identifier field;

retaining said cell loss priority field and said payload type identifier field in each cell header;

deleting said VCI, VPI and HEC fields in each cell header;

identifying new fields in each cell header comprising a cell type identifier field and a downlink beam identifier field;

formatting each field of each said cell header with sufficient information to route said cells from said select source terminal through said network and to said select destination terminal comprising the steps of:

placing a predetermined value in each said cell type identifier field in accordance with said AAL Protocol to identify that each said cell is to be treated in a connectionless manner, placing a predetermined value in each said cell loss priority field in accordance with said AAL Protocol to indicate a priority of said cell, placing a predetermined value in each said payload type identifier field to indicate a last cell of a message in accordance with said AAL Protocol, copying the selected downlink beam identifier from the address of the selected destination terminal, placing said copied downlink beam identifier into the downlink beam identifier field of each of the cell headers;

transmitting said cells through one of the uplink antenna beams to one of the satellites;

using value in said downlink beam identifier field to route the cells in the network to the satellite having the selected downlink antenna beam corresponding to the selected downlink beam identifier;

broadcasting said cells over the selected downlink antenna beam; and, receiving said cells by destination terminals located within said selected downlink antenna beam, one of the destination terminals being the selected destination terminal.

12. The method as in claim 11, wherein the step of segmenting said data packet into one or more cells each cell having a preselected length further comprises the step of:

segmenting said data packet into one or more cells, each cell having a length of 53 octets, a preselected number of which comprises said cell header.

13. The method of claim 12, further comprising the steps of:

assigning a source terminal identifier value to the selected source terminal in the communications network; defining a source terminal identifier field in each cell header; and, placing the source terminal identifier value corresponding to the selected source terminal into the source terminal identifier field of each cell header.

14. The method of claim 13, further comprising the step of:

sorting said cells by source terminal identifier by said destination terminals located within said downlink antenna beam.

15. The method of claim 14, further comprising the step of:

assigning an address to the selected source terminal of which a preselected portion includes the source terminal identifier value corresponding to the selected source terminal; and, the step of placing the source terminal identifier value further comprises the step of:

copying the source terminal identifier value from the address of the selected destination terminal and placing the copied source terminal identifier value into the source terminal identifier field of each of the cell headers.

16. The method of claim 15, wherein the step of segmenting said data packet into one or more cells each cell having a predetermined length further comprises the step of:

segmenting said data packet into one or more cells, each cell having a length of 53 octets, a first five octets of which comprises said cell header.

17. The method of claim 15, wherein the step of segmenting said data packet into one or more cells, each cell having a predetermined length further comprises the steps of:

segmenting said data packet into one or more cells, each cell having a length of 53 octets, a first preselected number of octets which is greater than the first five octets comprising a cell header;

locating said cell type identifier, source terminal identifier field, payload type identifier and cell loss priority field within the first five octets of each cell; and, locating said downlink beam identifier field within each cell header and after said first five octets of said cell.

18. The method as in claim 15, further comprising the step of sorting said cells by said value in said priority field.

19. The method as in claim 15, further comprising the steps of:

retaining said header error correction field in each cell header; and, placing a predetermined value into each header error correction field in accordance with the AAL protocol which is to be used for header error correction.

20. The method as in claim 15, wherein the step of transmitting said cells through one of the uplink antenna beams to one of the satellites further comprises the step of:

transmitting said cells through one of the uplink antenna beams to one of the satellites in said network wherein each satellite has an on-board cell switch; and, the step of using said value in said downlink beam identifier field further comprising the steps of:

establishing a downlink beam identifier value look-up table on each satellite which correlates downlink beam identifier values to local routing values, each local routing value providing sufficient information to route the cells through each satellite's on-board cell switch;

reading said downlink beam identifier value in each said cell header by a satellite;

consulting said downlink beam identifier value look-up table for a local routing value;

using said local routing value to route said cells through each satellite's on-board cell switch; and, repeating the reading, consulting and routing steps by each satellite which receives said cells until one of the satellite routes the cells to the selected downlink antenna beam corresponding to the downlink beam identifier value.

21. The method as in claim 20, further comprising the steps of:

examining the cell body of each cell received by said destination terminals until said address of said selected destination terminal has been identified;

determining by said selected destination terminal that a user corresponding to said destination address is reachable by said selected destination terminal; and, accepting the cells by said selected destination terminal.

22. The method of claim 21, further comprising the steps of:

determining by other destination terminals receiving said cells that said user corresponding to said selected destination address is unreachable; and, discarding said cells by destination terminals which cannot reach said user.

23. The method of claim 22, wherein the step of examining said cell body of each cell received by said destination terminals until said destination address has been identified further comprises the step of:

reassembling said cells back into at least a partial said data packet by each destination terminal located within said downlink beam such that said destination address is reassembled.

* * * * *